United States Patent [19]
Wagner

[11] 3,960,048
[45] June 1, 1976

[54] FASTENER ASSEMBLY FOR CREATING ACCURATE TENSION INDICATING FASTENER AND METHOD OF CALIBRATING THE SAME

[75] Inventor: David Prugh Wagner, Geneva, Ill.

[73] Assignee: Illinois Tool Works Inc., Chicago, Ill.

[22] Filed: Mar. 28, 1975

[21] Appl. No.: 563,288

[52] U.S. Cl. .................................. 85/62; 29/446; 151/35; 151/38
[51] Int. Cl.² ................. F16B 31/02; F16B 39/24
[58] Field of Search ............ 85/62, 61; 151/38, 35, 151/37; 29/446, 452; 52/758 F

[56] References Cited
UNITED STATES PATENTS

| | | | |
|---|---|---|---|
| 1,923,647 | 8/1933 | Vera | 151/37 |
| 2,151,919 | 3/1939 | Jacobson | 151/37 |
| 2,464,152 | 3/1949 | Ralston | 85/62 |
| 3,072,093 | 1/1963 | Lanius | 85/62 X |
| 3,153,974 | 10/1964 | Canning | 85/62 |
| 3,421,563 | 1/1969 | Koss | 85/62 X |
| 3,474,701 | 10/1969 | Setzler | 85/62 |
| 3,476,010 | 11/1969 | Markey | 85/62 |
| 3,550,498 | 12/1970 | Briles | 85/1 JP |
| 3,631,910 | 1/1972 | Crowther et al. | 151/38 |
| 3,881,392 | 5/1975 | Curtis | 85/62 |

Primary Examiner—Ramon S. Britts
Attorney, Agent, or Firm—T. W. Buckman; R. W. Beart

[57] ABSTRACT

A fastener assembly for use in producing an accurate tension indicating fastener unit of the type including a rotary fastener member, a conical-like spring washer preassembled thereto and gauge member preassembled between the bearing surface of the fastener and the spring washer so as to be pinched therebetween upon compression of the washer under a predetermined load. The invention is also concerned with a method of accurately calibrating such a fastener unit.

10 Claims, 11 Drawing Figures

U.S. Patent June 1, 1976 3,960,048
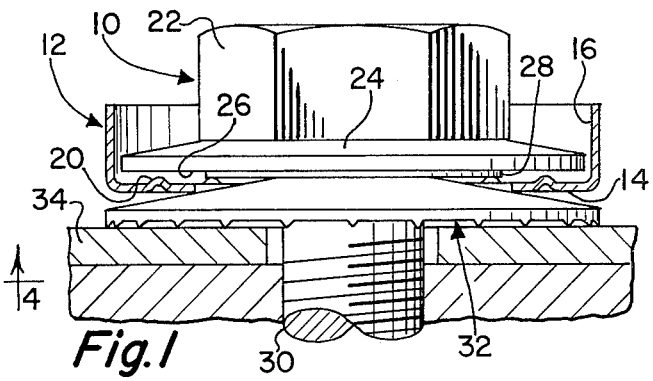
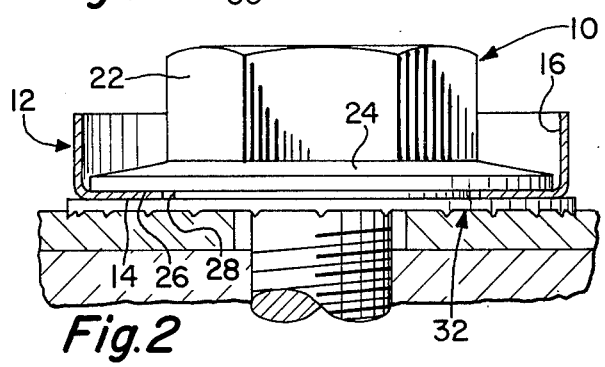
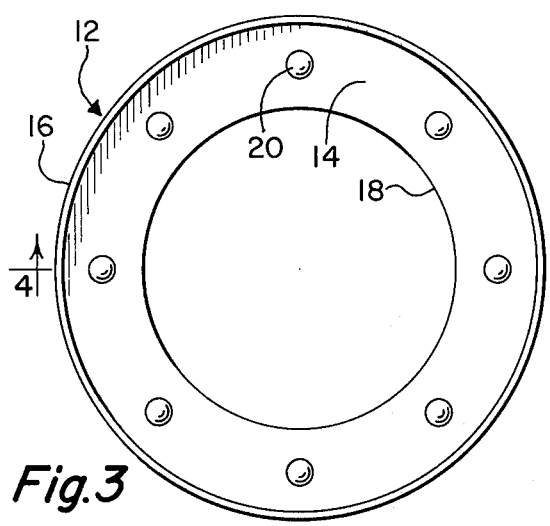
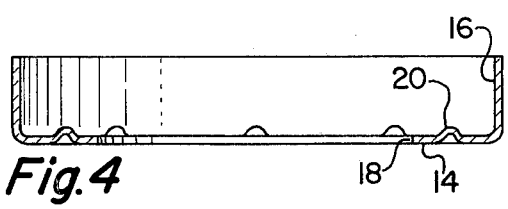
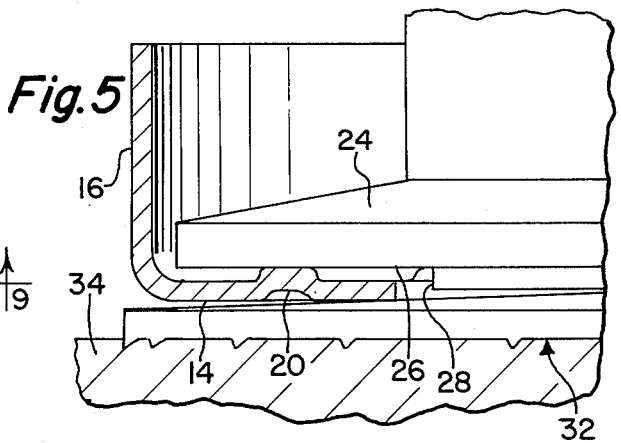
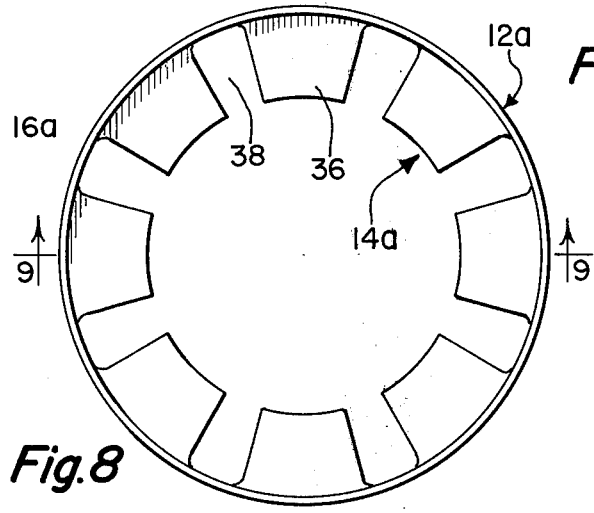
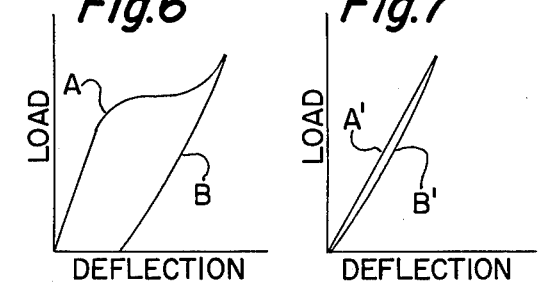
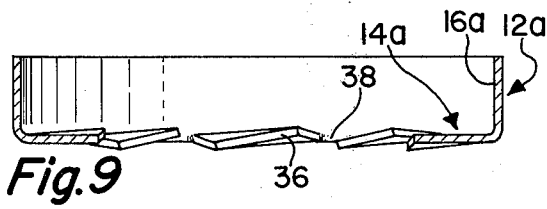
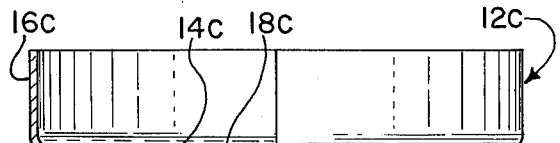
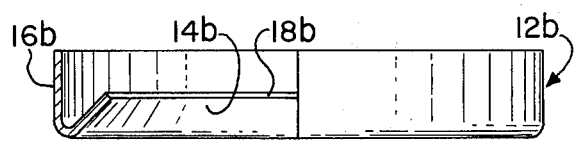

FASTENER ASSEMBLY FOR CREATING ACCURATE TENSION INDICATING FASTENER AND METHOD OF CALIBRATING THE SAME

BACKGROUND OF THE INVENTION

This invention relates to fastening devices generally and more particularly to devices designed to accurately and conveniently indicate a predetermined tension in a loaded joint.

It has been found desirable in many fastener applications to know that the tension produced in a joint is of a predetermined value and to ascertain when the joint has, in some manner, relieved the tension.

Frequent attempts in the prior art to identify and indicate the tension in the joint utilize the measurement of a more readily definable parameter, such as torque, used to apply the fastener. Since the actual tension produced in the joint is only roughly proportional to the torque, these devices have been found to be somewhat unreliable and inaccurate.

It has been found that the tension in a joint can be identified through the use of a preassembled fastener unit which includes a rotary fastener member having a conical-like washer preassembled thereto and which further includes a 1974, gauge preassembled to these two elements and interposed between the bearing surface of the fastener member and the conical washer. Such a device will properly indicate the tension in a joint based upon the relationship of the compression of the washer to a load applied to it. When a predetermined load, as identified by a certain compression of the washer, is reached the gauge will be pinched between the washer and the bearing surface thus serving to indicate the attainment of such a tension level. Of course, once the joint has relaxed, the gauge member will no longer be pinched in this manner and thus a policing of the joint is obtained through such a device. Exemplary of such a device is the tension indicating unit shown in commonly assigned application, Ser. No. 437,597, filed on Jan. 28, 1974, now U.S. Pat. No. 3,881,392.

While a device of the type just described provides an adequate indication of attainment of broad tension levels in a joint, it is often desirable to indicate tension levels in a joint with a very high degree of accuracy and within a very narrow range of loads on the joint.

Accordingly, it is an object of this invention to provide a preassembled fastener unit of the type including a rotatable fastener member, a conical-like spring washer and a gauge member adapted to be pinched therebetween which is capable of accurate indication of tension in a joint.

It is a further object of the invention to provide a preassembled fastener device capable of minimizing the effects of conventional manufacturing tolerances and discrepancies in a device of the type described.

It is still a further object of the invention to provide a preassembled fastener device and method of calibrating the same wherein the deflection or compression of the washer may be directly and predictably relatable to the load applied thereto.

It is thus an advantage of the present invention that a tension indicating fastener device, capable of accurate measurements of tension level in a joint, can be produced without the requirement that manufacturing tolerances in the production of the individual elements be reduced.

The above and other objects and advantages are obtained by the present invention wherein a fastener assembly including a rotatable fastener member, a generally conical spring washer preassembled thereto, a ring gauge positioned between the washer and the fastener member provided with compressible means permitting the ring gauge to be compressed relative to the fastener member and spring washer during a preloading thereof. Such compressible means may take the form of protuberances, increased thickness of material associated with interruptions in the inner periphery of the gauge or other means capable of permitting a reduction in the transverse dimension of the ring gauge to become calibrated so as to be subsequently capable of indicating a predetermined tension level in the fastening device. A method of calibrating such a device is also disclosed and claimed wherein the preassembled unit with said compressible means is subjected to a compression load to deflect the spring washer to a flattened or other predetermined position so that subsequent compression of the washer device will be in accordance with a reliable load-deflection curve. This aspect of the invention in conjunction with the calibration of the ring gauge to an accurate dimension provides a fastener device which is thereafter capable of accurately indicating tension levels in the system.

BRIEF DESCRIPTION OF THE DRAWINGS

FIG. 1 is a side elevational view of the fastener unit, in partial section, prior to the preloading thereof.

FIG. 2 is a side elevational view similar to FIG. 1 showing the fastener unit under a preload.

FIG. 3 is a top plan view of a preferred embodiment of a ring gauge for the present invention.

FIG. 4 is a sectional view taken along the line 4—4 of the ring gauge shown in FIG. 3.

FIG. 5 is an enlarged partial sectional view of a fastener assembly of the present invention under a preload which does not totally flatten the conical washer.

FIGS. 6 and 7 are typical curves showing the load and deflection relationships respectively of a conical spring-type washer during the initial loading thereof and during a subsequent loading of the washer device.

FIG. 8 is a top plan view of another embodiment of a ring gauge which may be used in the present invention.

FIG. 9 is a cross-sectional view taken along the lines 9—9 of the ring gauge embodiment shown in FIG. 8.

FIG. 10 is a side view in partial section of yet another embodiment of a ring gauge which may be used in accordance with the teachings of the present invention.

FIG. 11 is a side view in partial section of still another embodiment of a ring gauge which may be used in accordance with the teachings of the present invention.

DESCRIPTION OF THE PREFERRED EMBODIMENTS

Referring now generally to the drawings, the fastener unit 10 of the invention will be shown in FIG. 1 to include a rotary fastener member, such as a bolt, having a head with rotation inducing surfaces 22 and a generally circular washer base 24, a conical-like spring washer 32 preassembled to the bolt, beneath the head, in conventional fashion and further including a ring gauge member 12 preassembled to the unit by positioning an inwardly extending flange portion 14 between the bearing surface of the bolt head and the upper surface of the conical washer.

A fastener unit of this general type is capable of providing a true indication of the tension or load in a fastened joint. Such an indication is accomplished primarily by analyzing a predetermined load-deflection relationship for the conical washer and designing a system wherein the gauge 12 is pinched between the fastener head and the washer and restrained from free rotation about the fastener axis when the washer has been compressed to a certain predetermined amount. It should be apparent that a tension indicating device of this type must be designed so that the inner periphery 18 of the gauge 12 is substantially concentric to the inner periphery of the conical washer so that the gauge may be pinched at the desired tension level. This is, in part, accomplished through the provision of upstanding wall sections 16 which surround the washer base of the bolt head to restrict lateral movement of the gauge.

A further parameter which must be considered in such a fastener unit is the control of the dimension between the bearing surface of the bolt head and the upper surface of the washer and the thickness or transverse dimension of the flange, all of which determine when the flange will be pinched therebetween. It is this parameter that the present invention controls and calibrates to give a highly accurate tension indicating fastener assembly.

In the particular device illustrated in FIGS. 1–5, a ring gauge member 12 includes a flange 14 with a generally circular aperture 18 forming the inner periphery thereof. It will be noted that the surface of the flange includes dimples or protuberances 20 formed thereon. These dimples effectively increase the thickness of the flange or the transverse dimension of the flange in a predetermined location. This increase in thickness of the transverse dimension will be of such an extent to be significantly greater than the design thickness of the flange in that location.

As stated earlier, an accurate control of the thickness of the gauge and distance between the bolt head and washer at a given location are important to the reliable tension indicating capabilities of a device of this type. However, conventional tolerances in the forming of a gauge of this type quite often, in conjunction with the tolerance buildup in the manufacture of the washer and the bearing surface, render it extremely difficult to control these parameters.

The use of the dimples 20 which are compressible relative to the bearing surface 26 and the washer 32 in conjunction with a preloading of the assembly accomplishes a careful calibration of this important parameter. For purposes of this invention it is preferred that the material hardness of the ring gauge be considerably less than that of the fastener member and spring washer member. For example, if the fastener member is made of SAE 1022 steel, the conical washer of SAE 1050 steel and the ring gauge of SAE 1010 steel, when these three elements are preassembled and heat treated together the hardness of the ring gauge will be, in fact, considerably less than that of the fastener member and spring washer.

Thus, it will be seen that the use of a ring gauge member with means permitting a substantially permanent compression thereof relative to the fastener member and spring washer in conjunction with a preloading or calibration step will produce a tension indicating fastener assembly which is capable of accurately determining and indicating the tension is a joint. The use of the device shown in FIG. 1 as an intermediate product followed by the step of preloading such a device, as shown in FIG. 2, so that the dimples are compressed, eliminates the problems which may be due to the rather large tolerances present in the material thickness and cold heading of the fastener member. It has been found that most applications of a device of this type envision the complete flattening or substantially complete flattening of the spring washer member. Therefore, to fully utilize the tension indicating technique of this type of device, a recess or undercut 28 is provided in the bearing surface of the fastener member. In actual practice, the increased thickness provided by the dimples 20 is considerably greater than the height of the recess 28 so that a preloading of the device to complete flattening or substantially complete flattening will compress the gauge so that its thickness is equal to the height of the recess.

While the preferred and customary usage of such a fastening device requires that the assembly be preloaded to a tension level which completely compresses the spring washer, it will be seen from FIG. 5 that the present invention can be utilized to calibrate a fastener assembly where the tension level is less than that required to completely compress the washer. In such an example, the dimples 20 or compressible means on the washer will be partially compressed and will, in the example utilizing a recess 28, remain slightly greater in transverse thickness than the height of the recess.

For the purpose of describing a further feature of this invention, attention is directed to FIGS. 6 and 7 wherein typical load-deflection curves are shown for a conical washer of the type used in the assembly during the calibration and subsequent to the calibration. Conical washers of the type used in this invention do not typically function as a true spring in that they are designed so as to necessarily be compressed beyond their elastic limit at a predetermined load. Such a washer may be undesirable for use in a device of the type described by the invention which requires a directly relatable load-deflection curve. Curve A in FIG. 6 typically shows the relationship between an initial load applied to a washer, such as washer 32, and the amount of compression thereof. The flat, substantially horizontal portion of the curve essentially indicates that the load is such that the elastic limit is exceeded and the washer gives until the setting is completed. After this, very little deflection occurs as the load increases since the washer is practically flat. The curve B shows the load-deflection relationship upon release of the load and it is apparent therefrom that the washer has taken a substantial permanent set. The preloading aspect of the present invention eliminates the undesirable characteristics of curve A and allows the washer to be subsequently used in its intended fastening environment to perform substantially as a true spring and more in accordance with the load-deflection curve shown in FIG. 7. In this relationship, curve A' shows a more predictable and directly relatable relationship between the load applied and the compression of the washer. It will be seen from curve B' that upon relaxation of the washer after it has been loaded in accordance with the curve A' that there has been substantially no permanent set taken by the washer.

The assembly described in this invention thus provides a product which can be calibrated to eliminate many manufacturing tolerance errors which must be critically controlled, in addition to providing an end product which includes a conical spring member capable of functioning as a true spring. Both of these aspects are extremely important to the provision of an accurately calibrated tension indicating fastener assembly.

It should be understood that there may be modifications to the gauge 12 which provide structure different from the dimples 20 but still function to permit compressibility of the flange from a thickness or transverse dimension, which is purposely greater than the design dimension, of the flange to a carefully calibrated thickness or transverse dimension. In FIGS. 8 and 9, one such alternate embodiment is described wherein a plurality of inwardly extending tabs 36 are provided as the flange portion 14a in gauge 12a. These tabs are spaced from one another by an equal plurality of gaps or interruptions 38. The gaps 38 thus permit the lateral flowing or compressing of the flange 14a from a thickness which is greater than the design thickness to achieve a carefully controlled calibration during the preloading of the assembly. It is contemplated that the increase in transverse dimension may be accomplished additionally through a slight twist along a radial axis of the tabs to provide segments thereof which cumulatively produce an increased transverse dimension of the flange but which may be readily and substantially permanently compressed to the desired design thickness.

FIGS. 10 and 11 describe yet further embodiments of the ring gauge which could be used within the teaching of this invention. In FIG. 10 the ring gauge 12b will include a flange 14b which extends at an angle to a plane which is substantially perpendicular to the axis of the ring gauge and the fastener member. Flange 14b is shown to be turned upwardly so that the inner periphery 18b is spaced axially above the juncture of the flange with the side wall portion 16b. In FIG. 11, the ring gauge 12c includes a flange 14c which is turned downwardly so that the inner periphery 18c is spaced downwardly of the juncture of the flange with side walls 16c. In both of these embodiments, a preloading of the assembly will deform the flange so that the effective transverse dimension between the inner periphery of the flange and the outer periphery of the gauge is a predetermined, carefully controlled distance, directly relatable to a predetermined tension level in the system.

While the preferred embodiments of the invention show a bolttype fastener member, it should be recognized that a nut member could be utilized in a fastener assembly of the type described and still be within the basic teachings of the invention. The invention broadly contemplates purposely increasing the thickness or transverse dimension of the flange of a ring gauge an amount greater than the design thickness, preloading the assembly to compress the flange to the desired thickness while preparing the washer to function thereafter as a true spring.

Thus it is apparent that there has been provided, in accordance with the invention, a tension indicating fastener unit that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. An intermediate product relating to a fastener unit capable of accurately indicating a predetermined tension in a fastened joint, including a rotary fastener member having a central axis and predetermined radial dimension, a generally planar bearing surface beneath said fastener member, a conical-like spring washer preassembled to said fastener member and ring gauge member preassembled to the fastener member and spring washer with an inwardly extending flange interposed between the bearing surface of the fastener member and the upper surface of the spring member, the ring gauge further including upstanding side wall portions at the outer periphery thereof and surrounding the outer periphery of the bearing surface defined by the predetermined radial dimension so that the inner periphery of the ring gauge will be positioned and retained concentric to the central axis of the fastener member and outwardly of the inner periphery of the spring washer, the bearing surface of the fastener member being provided with a recess of predetermined height at the outer peripheral margin thereof and adapted to receive the flange of the gauge member therein, the ring gauge member being of a softer material than the material of the fastener member and the spring washer, the flange of the ring gauge including means capable of being compressed and permanently deformed, the compressible means providing a thickness dimension in that region of the flange which is greater than the predetermined height of the recess, whereby the intermediate product may be preloaded to a predetermined axial compression of the spring washer thereby creating a spring washer member capable of subsequent compression in direct relationship to load and eliminating, by permanent deformation of the means on the flange to a design thickness, any potential inaccuracies in the tension indicating capabilities of the unit due to variances from the design flange thickness.

2. The product of claim 1 wherein the inner periphery of the ring gauge is interrupted with the thickness of the flange at its inner peripheral margin being greater than the predetermined height of the recess thereby providing space into which the inner peripheral margin of the flange may flow upon compression between the bearing surface and the conical washer.

3. The product of claim 2, wherein the flange is, at least in part, formed from circumferentially spaced tabs extending radially inwardly from the rim of the gauge.

4. The product of claim 3, wherein the tabs are slightly twisted about a radial axis thereof providing the flange with a transverse dimension at its inner periphery which is greater than the transverse dimension of the flange adjacent its juncture with the rim portion, the transverse dimension at the inner periphery of the gauge also being greater than the predetermined height of the recess.

5. The product of claim 1, wherein the flange of the gauge is inclined relative to a plane extending generally perpendicular and transverse the axis of the gauge and fastener member.

6. The product of claim 5, wherein the flange is formed so that the inner periphery thereof is spaced upwardly from the juncture line of the flange with the rim.

7. The product of claim 5, wherein the flange is formed so that the inner periphery thereof is spaced downwardly from the juncture line of the flange with the rim.

8. The product of claim 1, wherein the compressible means in the flange are protuberances formed therein which increase the transverse dimension of the flange in that region thereof.

9. A method of making and calibrating a tension indicating fastener unit of the type including a rotary fastener member, a conical washer and a ring gauge which includes a rim surrounding the rotary fastener and a flange interposed between the upper surface of the washer and a bearing surface of the fastener member with the inner periphery of the gauge spaced radially outwardly from and concentric to the inner periphery of the washer, the bearing surface of the fastener member being provided with a recess of predetermined height at the outer peripheral margin thereof and adapted to receive the flange of the gauge therein, the gauge thereby being adapted to be pinched therebetween when the conical washer has been compressed to an amount directly relatable to a certain predetermined tension in the system, the method including forming the ring gauge of a material softer than the material of the fastener and washer and therefore compressible relative thereto, providing means on the flange portion capable of being compressed and thereby reducing the thickness of the flange in the region of said means to the predetermined height of the recess, placing a predetermined compressive load sufficient to exceed the elastic limit of the conical washer on the system thereby compressing the means on the flange to reduce inaccuracies in the unit which may be present due to manufacturing tolerances in the thickness of the flange, releasing said compressive load so that subsequent compression of the washer in its intended fastening environment will be that of a substantially true spring where the axial compression thereof may be directly relatable to load applied thereto whereby the unit will be capable of pinching the gauge between the bearin surface of the fastener member and the washer at bearing proper, predetermined tension level.

10. The method of calibrating as in claim 9, wherein the system is loaded so that the conical washer is substantially flattened prior to releasing said compressive load.

* * * * *